3,176,036
PROCESS FOR MAKING PYROPHOSPHATE ESTERS USING KETENE DIMER

Teruaki Mukaiyama, Tokyo, and Tsujiaki Hata, Yokosuka-shi, Japan, assignors to Asahi Kasei Kogyo Kabushiki Kaisha, Osaka, Japan, a corporation of Japan
No Drawing. Filed Apr. 1, 1963, Ser. No. 269,718
Claims priority, application Japan, Mar. 31, 1962, 37/12,130
5 Claims. (Cl. 260—461)

This invention is concerned primarily with a process for preparing pyrophosphates from phosphates in the presence of ketene dimer.

The process of this invention has the following equation:

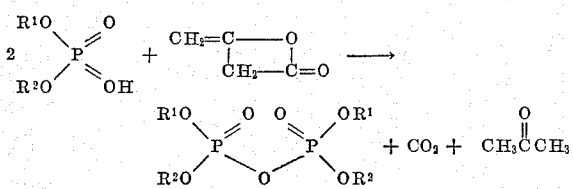

wherein $R^1$ is hydrogen or alkyl, aralkyl or aryl radicals and $R^2$ is alkyl, aralkyl or aryl radicals.

As will be apparent from the above formula, the process of this invention includes the preparation of tetra-p-nitrophenyl pyrophosphate, tetraphenyl pyrophosphate, tetrabenzyl pyrophosphate which are generally used as phosphorylating agents for carbohydrates, nucleosides and other naturally occurring compounds containing a hydroxyl group.

For the preparation of pyrophosphates from phosphates, various attempts have been made by using carbodiimides, ketoxime-sulfonates, isocyanates, phosphoramidates. These methods, however, are not commercially feasible, because they use expensive chemicals, complex processes and involve difficult removal of by-products.

This invention overcomes these disadvantages by using ketene dimer, which is easily available in commercial quantities and can be removed as carbon dioxide and acetone after the reaction is completed.

The chemical reaction of this invention is assumed to proceed as follows:

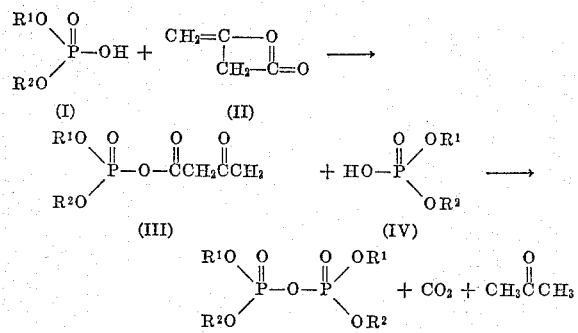

Phosphates (I) react with ketene dimer (II) to make addition compounds (III), which react again with phosphates (IV) to make pyrophosphates. This chemical reaction produces carbon dioxide and acetone which are easily removable by-products.

Ketene dimer used in this invention has a suitable boiling point, at which the reaction proceeds smoothly and is completed in a short time with high yield.

As will be apparent from the above description, this invention has more applicability for the production of pyrophosphates on a commercial scale as compared with the other methods.

For $R^1$ and $R^2$ in the above formula, methyl, ethyl, n- or iso-propyl, or n- or iso-butyl radicals may be employed as alkyl radicals, benzyl radical as aralkyl radicals, or phenyl, p-nitrophenyl, or p-chlorophenyl radicals as aryl radicals.

In carrying out this invention, the reaction occurs without the presence of organic or inorganic bases. The presence of organic or inorganic bases, however, gives better results as seen in Cramer (Chem. Ber., 92, 2761 (1959)), in which the nucleophilic reaction of monophenyl phosphate with isocyanates proceeds only under the presence of triethylamine. As the base used in this invention, either an inorganic or an organic base is employed. In general, organic bases, especially tertiary amine such as trimethylamine, triethylamine, pyridine, N-dimethylaniline and so on, give excellent results.

As inorganic bases, aqueous alkali such as KOH, and NaOH is usually used. The suitable amount of bases is the same molar ratio to the phosphates used, but the reaction occurs with greater or less amounts of bases.

In a general way to carry out this invention, one mole of ketene dimer was dropwise added to 2 moles of phosphates and 2 moles of bases dissolved to suitable solvent such as ether, dioxane, acetonitrile.

The reaction mixture is refluxed until the evolution of carbonic dioxide ceases. After removal of solvent and acetone formed as by-products, the pyrophosphates is collected and purified as free or their salts followed by recrystallization from suitable solvents or distillation under vacuum.

For carrying out this invention, inactive solvents toward reactants and products such as acetonitrile, dioxane, ether are used.

The length of time required for this reaction is a function of the temperature and reactants, a period of 1 to 3 hours being required when monophenyl phosphate, p-chlorophenyl phosphate or bis-p-nitrophenyl phosphate is employed at the boiling point of the mixture of ketene dimer and acetonitrile, dioxane or ether. (40–110° C.)

The following examples are illustrative of the invention and make more clear that this invention is excellent for applying in commercial scale to produce pyrophosphates with high yield under mild conditions.

Example 1

Ketene dimer 1.0 gram dissolved in 5 ml. of acetonitrile was added dropwise over a period of 5 minutes to a mixture of 3.48 grams of monophenyl phosphate, 1.58 grams of pyridine and 5 ml. of acetonitrile. The reaction mixture was refluxed for an additional 1 hour and carbon dioxide was evolved during this period. A solution of barium chloride ($BaCl_2 \cdot 2H_2O$, 0.45 gram) in 20 ml. of 25% pyridine was added to the cold reaction mixture and allowed to stand in a refrigerator for about 30 minutes. The white precipitate was washed with acetone, dried, and then washed with 5 ml. of water thoroughly. The undissolved precipitate was filtered and dried in vacuo over phosphorus pentoxide at room temperature, 3.62 grams (yield 72%) of barium diphenyl pyrophosphate were obtained.

*Analysis.*—Calcd. for $C_{12}H_{10}P_2O_7Ba \cdot H_2O$: P, 12.4%. Found: P, 12.3%.

Barium monophenyl phosphate 1.1 grams (yield 18%) was recovered by adding 10 ml. of pyridine and 20 ml. of acetonitrile to the latter filtrate.

*Analysis.*—Calcd. for $C_6H_5PO_4BaH_2O$: P, 9.45%. Found: P, 9.35%.

Example 2

Treatment of a mixture of 4.2 grams of p-chlorophenyl phosphate, 3.0 grams of diethyl aniline and 5 ml. of acetonitrile with 1.0 gram of ketene dimer dissolved in 5 ml. of acetonitrile exactly as in Example 1 gave 3.7 grams (yield 70%) of barium bis-p-chlorophenyl pyrophosphate.

*Analysis.*—Calcd. for $C_{12}H_8Cl_2P_2O_7Ba \cdot 2H_2O$: P, 10.9%. Found: P, 11.1%.

Example 3

To a mixture of 6.8 grams of bis-p-nitrophenyl phosphate, 1.58 grams of pyridine and 30 ml. of dioxane was added dropwise 1.0 gram of ketene dimer dissolved in 10 ml. of diorane. After the reaction mixture was refluxed for 3 hours, dioxane, acetone and pyridine were removed under vacuum. The residue was recrystallized from dioxane, 6.1 grams (yield 92%) of tetra-p-nitrophenyl pyrophosphate were obtained. Heated in a vacuum, this compound melted at 126–127° C., then re-solidified and melted at 146–148° C.

Example 4

Treatment of the mixture of 5.56 grams of dibenzyl phosphate, 1.58 grams of pyridine and 20 ml. of ether with 1.0 gram of ketene dimer dissolved in 5 ml. of ether exactly as in Example 3 gave 4.8 grams (yield 91%) of tetrabenzyl pyrophosphate, which are recrystallized from chloroform-light petroleum (B.P. 40–60° C.). (M.P. 61–62° C.).

Example 5

Treatment of a mixture of 5 grams of diphenyl phosphate, 1.58 grams of pyridine and 20 ml. of ether with 1.0 gram of ketene dimer dissolved in 5 ml. of ether exactly as in Example 3 gave tetraphenyl pyrophosphate as a viscous oil; the product was assayed by reacting with excess of cyclohexylamine (N. S. Corby, G. W. Kenner, and A. R. Todd), J. Chem. Soc., 1234 (1952)) to give 3.0 grams (yield 91%) of diphenyl cyclohexyl phosphoramidate and 3.2 grams (yield 92%) of cyclohexylammonium diphenyl phosphate.

Example 6

Ketene dimer 1.5 grams dissolved in 10 ml. of ether was added dropwise over a period of 5 minutes to 10 ml. of ether solution containing 5.1 grams of diethyl phosphate. The reaction mixture was refluxed for an additional 1 hour and carbon dioxide was evolved during this period. After removal of ether and acetone, 4.5 grams (yield 92%) of tetraethyl pyrophosphate were collected by distillation under vacuum (B.P. 148–149° C./1.5 mm.).

What we claim is:

1. A process for preparing a pyrophosphate from a phosphate in the presence of ketene dimer according to the following equation:

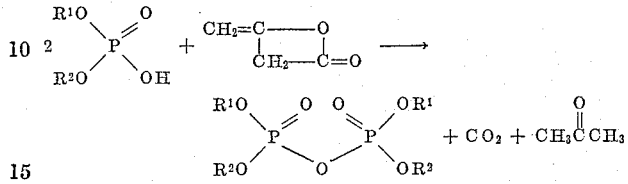

wherein $R^1$ is a member selected from the group consisting of hydrogen and methyl, ethyl, phenyl, p-nitrophenyl, and benzyl radicals, and $R^2$ is a member selected from the group consisting of methyl, ethyl, phenyl, p-nitrophenyl, p-chlorophenyl, and benzyl radicals.

2. A process according to claim 1, wherein the reaction is effected in an inactive solvent selected from the group consisting of ether, dioxane and acetonitrile.

3. A process according to claim 2, wherein the reaction is effected at the boiling point of the solvent.

4. A process according to claim 1 wherein the reaction is effected in the presence of one of inorganic and organic bases.

5. A process according to claim 4, wherein the organic base is at least one organic base selected from the group consisting of trimethylamine, pyridine and dimethyl aniline.

References Cited by the Examiner

UNITED STATES PATENTS 2,476,859  7/49  Hagemeyer _____ 260—546 XR

OTHER REFERENCES

Cramer: "Chem. Ber.," 92, 2761–2767 (1959).

CHARLES B. PARKER, *Primary Examiner.*